United States Patent
Warrick

(10) Patent No.: US 10,812,596 B2
(45) Date of Patent: Oct. 20, 2020

(54) IN-ROOM DEVICE CONTROL SYSTEM

(71) Applicant: Bullhead Innovations Ltd., Calgary (CA)

(72) Inventor: Peter S. Warrick, Calgary (CA)

(73) Assignee: Bullhead Innovations Ltd. (CA)

( * ) Notice: Subject to any disclaimer, the term of this patent is extended or adjusted under 35 U.S.C. 154(b) by 0 days.

(21) Appl. No.: 16/217,958

(22) Filed: Dec. 12, 2018

(65) Prior Publication Data

US 2019/0190992 A1    Jun. 20, 2019

Related U.S. Application Data

(60) Provisional application No. 62/608,071, filed on Dec. 20, 2017.

(51) Int. Cl.
*H04W 4/70* (2018.01)
*H04L 29/08* (2006.01)
(Continued)

(52) U.S. Cl.
CPC .......... *H04L 67/125* (2013.01); *H04L 12/282* (2013.01); *H04L 63/107* (2013.01);
(Continued)

(58) Field of Classification Search
CPC ... H04L 67/125; H04L 12/282; H04L 63/107; H04L 12/66; H04L 67/26; H04L 67/141;
(Continued)

(56) References Cited

U.S. PATENT DOCUMENTS 6,738,382 B1    5/2004  West et al.
6,996,073 B2    2/2006  West et al.
(Continued)

FOREIGN PATENT DOCUMENTS

CA    2709651 C    12/2010
CN    107637022    1/2018
(Continued)

OTHER PUBLICATIONS

European Patent Office, "The extended European search report" dated Nov. 19, 2019 in counterpart application EP19173495.3.

*Primary Examiner* — Hai Phan
*Assistant Examiner* — Anthony D Afrifa-Kyei
(74) *Attorney, Agent, or Firm* — ATMAC Patent Services Ltd.; Andrew T. MacMillan

(57) ABSTRACT

Internet of things (IoT) hubs are distributed in a hospitality establishment and are connected to a control server. Various IoT devices are installed in each room or other separate guest area within the hospitality establishment. The hubs are located such that each IoT device is within a predetermined distance from at least one hub. The control server has mappings of which IoT devices are in which rooms and has mappings of which hubs are used to control which IoT devices. When a state change message is received from a user device, the control server confirms the user device is currently associated with at least one guest room and then determines which target IoT devices are affected by the state change message. The control server then sends commands to the various one or more hubs that control the target IoT devices in order to effect the state changes.

20 Claims, 5 Drawing Sheets

(51) Int. Cl.
*H04L 12/28* (2006.01)
*H04W 12/00* (2009.01)
*H04L 29/06* (2006.01)

(52) U.S. Cl.
CPC ....... *H04W 12/00503* (2019.01); *H04L 67/26* (2013.01); *H04W 4/70* (2018.02)

(58) Field of Classification Search
CPC ......... H04L 67/00; H04L 67/14; H04L 67/30; H04L 67/303; H04L 67/32; H04W 12/00503; H04W 4/70; H04M 11/00; H04M 11/10; H04M 2207/203; H04M 2242/30; H04M 11/007; G05B 2219/2642; G05B 19/042; G05B 19/00; G05B 19/02; G05B 19/04; G05B 19/0421; G05B 19/0423; G05B 19/0426; G05B 19/0428; G06F 3/16; G06F 3/167; G06Q 50/12; G10L 13/04; G10L 15/26
See application file for complete search history.

(56) References Cited

U.S. PATENT DOCUMENTS

| | | | |
|---|---|---|---|
| 7,580,376 B2 | 8/2009 | West et al. |
| 8,250,601 B2 | 8/2012 | King |
| 8,732,753 B2 | 5/2014 | Warrick |
| 8,854,195 B2 | 10/2014 | West et al. |
| 9,025,599 B2 | 5/2015 | Smith et al. |
| 9,060,197 B2 | 6/2015 | Warrick et al. |
| 9,106,796 B2 | 8/2015 | King |
| 9,137,281 B2 | 9/2015 | Warrick et al. |
| 9,503,419 B2 | 11/2016 | Smith et al. |
| 9,584,848 B2 | 2/2017 | Warrick |
| 9,705,846 B2 | 7/2017 | Smith et al. |
| 9,942,595 B2 | 4/2018 | Warrick et al. |
| 10,148,996 B2 | 12/2018 | Warrick et al. |
| 10,164,940 B2 | 12/2018 | Smith et al. |
| 2011/0061014 A1* | 3/2011 | Frader-Thompson ........ G06Q 30/0277 715/771 |
| 2011/0302607 A1 | 12/2011 | Warrick et al. |
| 2015/0350017 A1 | 12/2015 | King |
| 2015/0373123 A1* | 12/2015 | Warrick ................ H04L 67/303 709/228 |
| 2016/0365986 A1 | 12/2016 | Song et al. |
| 2017/0171131 A1* | 6/2017 | Steiner .................... H04L 51/02 |
| 2017/0171178 A1 | 6/2017 | Reynders |
| 2018/0089653 A1* | 3/2018 | Merkh .................... G06Q 20/18 |
| 2018/0167516 A1 | 6/2018 | Warrick |
| 2019/0041845 A1* | 2/2019 | Cella ................ G05B 19/41865 |
| 2019/0045067 A1 | 2/2019 | Warrick |

FOREIGN PATENT DOCUMENTS

| | | |
|---|---|---|
| EP | 3268925 | 1/2018 |
| KR | 20160146396 | 12/2016 |
| WO | 2016200240 | 12/2016 |

\* cited by examiner

IN-ROOM DEVICE CONTROL SYSTEM

CROSS-REFERENCE TO RELATED APPLICATIONS

This application claims the benefit of priority of U.S. Provisional Application No. 62/608,071 filed Dec. 20, 2017, which is incorporated herein by reference.

BACKGROUND OF THE INVENTION

(1) Field of the Invention

The invention pertains generally to utilizing Internet of things (IoT) controllable devices at hospitality establishments such as hotels and resorts. More specifically, the invention relates to allowing guests and users to remotely operate in-room IoT devices from mobile phones and other user devices.

(2) Description of the Related Art

There are variety of consumer grade home automation systems available on the market. These devices typically have an Internet Protocol (IP) based hub that communicates wirelessly to controllable devices installed around the home. Examples of controllable devices include thermostats, light switches and dimmers, garage door openers, curtain motors, door locks, cameras, security systems and alarms, speakers, etc. As the popularity of Internet of things (IoT) technology increases, it is expected that users will add more and more networked physical devices to their homes.

When users travel to hotels and resorts, there will be an expectation that the guest rooms, suites, and other temporary lodgings will also benefit from the increased convenience of these types of IoT controllable devices. However, deployment of consumer grade controllable devices and their associated hubs within a hospitality establishment is problematic. For security reasons, each room in a hotel is typically isolated and unrelated to other guest rooms. Installing a hub within each room and treating each room as a separate "house" may be cost prohibitive to some hotels. The management and configuration of many separate IoT installations and hubs for every room in the hotel is also excessive. Finally, treating each room as a separate IoT system also ignores the fact that, in hotels and other hospitality establishments, there is often a single management entity that operates the entire establishment.

BRIEF SUMMARY OF THE INVENTION

An exemplary object of some embodiments of the invention is to provide devices, systems, and methods allowing hospitality establishments to deploy consumer grade IoT controllable devices within and across their properties without requiring a separate hub for each guest room.

An exemplary object of some embodiments of the invention is to provide devices, systems, and methods allowing hospitality establishments to deploy consumer grade controllable devices within and across their properties while simultaneously accommodating the unique physical layout and associated radio interference that is caused by internal structures such as elevators and insulation between and around the guest rooms.

An exemplary object of some embodiments of the invention is to provide devices, systems, and methods allowing hospitality establishments to deploy consumer grade controllable devices within and across their properties while reducing latency of commands reaching each IoT device.

An exemplary object of some embodiments of the invention is to provide devices, systems, and methods allowing hospitality establishments to deploy consumer grade controllable devices within and across their properties while dynamically authorizing and unauthorizing different users as the guests of the establishment change over time.

An exemplary object of some embodiments of the invention is to provide devices, systems, and methods allowing hospitality establishments to deploy consumer grade controllable devices within and across their properties while allowing families and other groups to control multiple rooms' worth of devices at particular times.

An exemplary object of some embodiments of the invention is to provide devices, systems, and methods allowing hospitality establishments to deploy consumer grade controllable devices within and across their properties while providing command scripts, scenes, and other automatic routines to be configured and operate across the in-room devices within single rooms and across multiple rooms.

According to an exemplary embodiment of the invention there is disclosed a system for allowing user devices to remotely control in-room devices of a hospitality establishment. The system includes a control server coupled to a computer network, a plurality of hubs coupled to the control server, and a plurality of controllable devices located among a plurality of guest rooms of the hospitality establishment. Each of the controllable devices coupled to at least one of the hubs. The control server receives a state change message from a user device via the computer network. The control server determines an associated room according the state change message, the associated room being one of the guest rooms of the hospitality establishment with which the user device is associated. The control server determines a target controllable device according to the associated room, the target controllable device being located within the associated room. The control server determines a target hub according to the target controllable device, the target hub being coupled to the target controllable device. The control server sends a command to the target hub to change a state of the target controllable device according to the state change message.

According to an exemplary embodiment of the invention there is disclosed a control server for allowing user devices to remotely control in-room devices of a hospitality establishment, the hospitality establishment having a plurality of controllable devices located among a plurality of guest rooms and a plurality of hubs, and each of the controllable devices being coupled to at least one of the hubs. The control server includes a first communication interface coupled to a computer network, one or more second communication interfaces coupled to the plurality of hubs, a storage device, and one or more processors coupled to the first communication interface, the one or more second communication interfaces, and the storage device. By the one or more processors executing software instructions loaded from the storage device, the one or more processors are configured to receive a state change message from a user device via the computer network and determine an associated room according the state change message, the associated room being one of the guest rooms of the hospitality establishment with which the user device is associated. The one or more processors are further configured to determine a target controllable device according to the associated room, the target controllable device being located within the associated room and determine a target hub according to the target controllable device, the target hub being coupled to the target controllable device. The one or more processors are further configured to send a command to the target hub to change a state of the target controllable device according to the state change message.

According to an exemplary embodiment of the invention there is disclosed a method of allowing user devices to remotely control in-room devices of a hospitality establishment. The hospitality establishment has a plurality of controllable devices located among a plurality of guest rooms and a plurality of hubs, and each of the controllable devices are coupled to at least one of the hubs. The method includes receiving a state change message from a user device via a computer network, determining an associated room according the state change message, the associated room being one of the guest rooms of the hospitality establishment with which the user device is associated, and determining a target controllable device according to the associated room, the target controllable device being located within the associated room. The method further includes determining a target hub according to the target controllable device, the target hub being coupled to the target controllable device. The method further includes sending a command to the target hub to change a state of the target controllable device according to the state change message.

These and other advantages and embodiments of the present invention will no doubt become apparent to those of ordinary skill in the art after reading the following detailed description of preferred embodiments illustrated in the various figures and drawings.

BRIEF DESCRIPTION OF THE DRAWINGS

The invention will be described in greater detail with reference to the accompanying drawings which represent preferred embodiments thereof.

DETAILED DESCRIPTION

Figure 1:
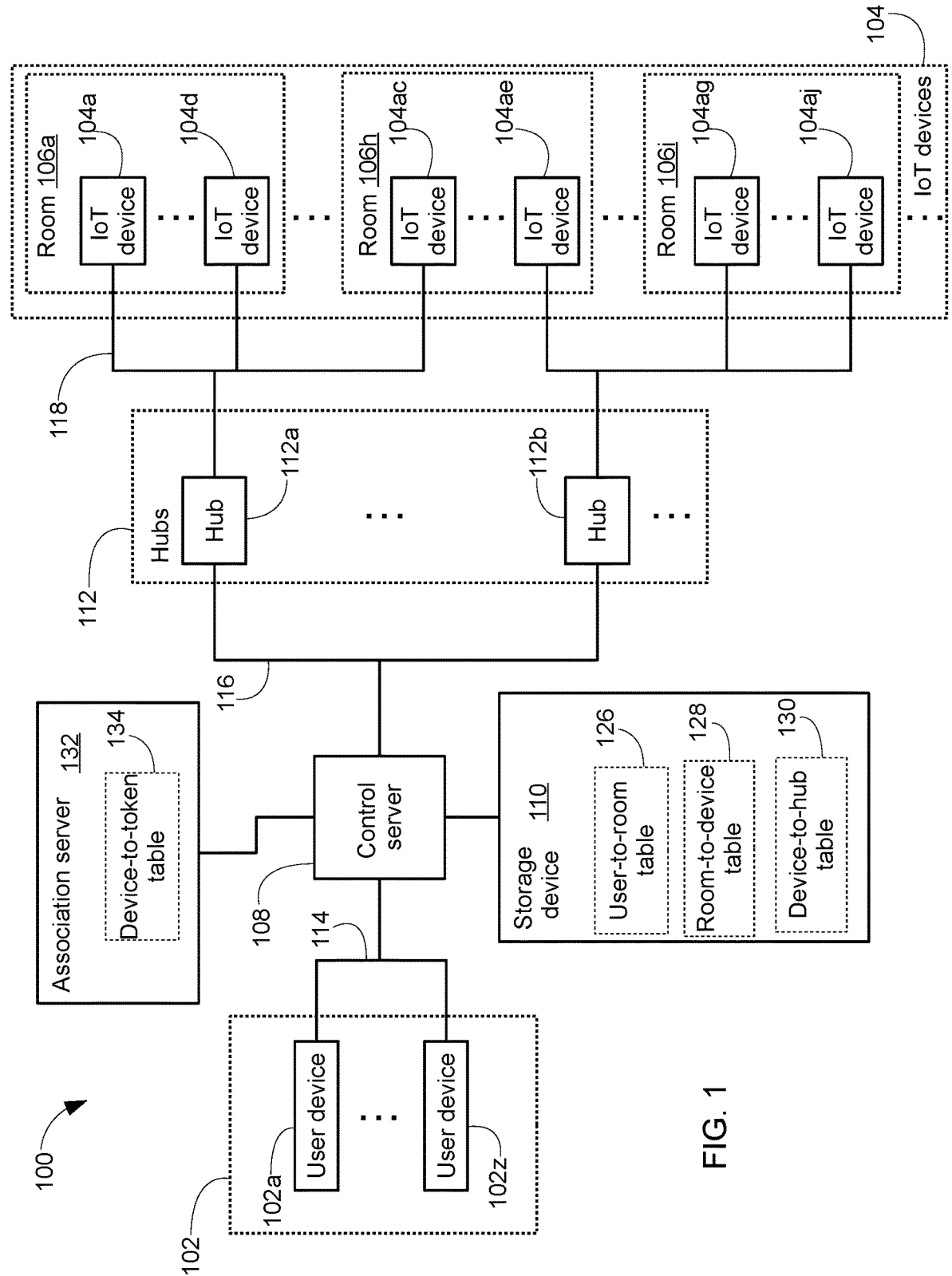
FIG. 1 shows a block diagram of a system allowing user devices to remotely control a plurality of in-room devices installed in different rooms of a hospitality establishment according to an exemplary embodiment.

FIG. 1 shows a block diagram of a system 100 allowing user devices 102 to remotely control a plurality of in-room Internet of things (IoT) devices 104 installed in different rooms 106 of a hospitality establishment according to an exemplary embodiment. A plurality of user devices 102 are coupled to a control server 108, and the control server 108 internally includes or is otherwise coupled to a storage device 110 storing data and software programs for use by one or more processors of the control server 108. The control server 108 in turn is coupled to an association server 109 along with a plurality of hubs 112 distributed physically throughout the hospitality establishment, and the hubs 112 are coupled to a plurality of IoT devices 104 installed within the various guest rooms 106 of the hospitality establishment.

In this embodiment, the user devices 102 are coupled to the control server 108 via a combination of wireless and wired connections 114 (e.g., Wi-Fi access points and Ethernet cables), the control server 108 is coupled to the hubs 112 via wired connections 116 such as Ethernet cabling, and the hubs 112 are coupled to the in-room IoT devices 104 via wireless connections 118 using the Zigbee™ and/or Zwave™ wireless protocols.

In this embodiment, the user devices 102 are operated by guests of the hospitality establishment and include mobile phones, netbook computers, laptop computers, desktop computers, tablet computers, and any other electronic user-operable devices. The control server 108 is a computer server located either on-premise at the hospitality establishment such as on a local area network (LAN), or located on the Internet (i.e., cloud) and accessible to the LAN via a wide area network. The hubs 112 are consumer grade appliances for controlling IoT devices 104, and the hubs 112 convert IP based communications into appropriate commands that are transmitted by the hubs 112 to the various IoT devices 104. The IoT devices 104 are consumer grade IoT devices and connect and communicate wirelessly with the hubs 112.

As illustrated in FIG. 1, the system 100 does not require that each guest room 106 be equipped with a single hub 112. Instead, one hub 112 may be coupled to a plurality of IoT devices 104 across a plurality of separate rooms 106. This is illustrated in FIG. 1, for example, where hub 112a is coupled at least to IoT devices 104a, 104d, 104ac, which are installed in two guest rooms 106a, 106h.

Figure 2:
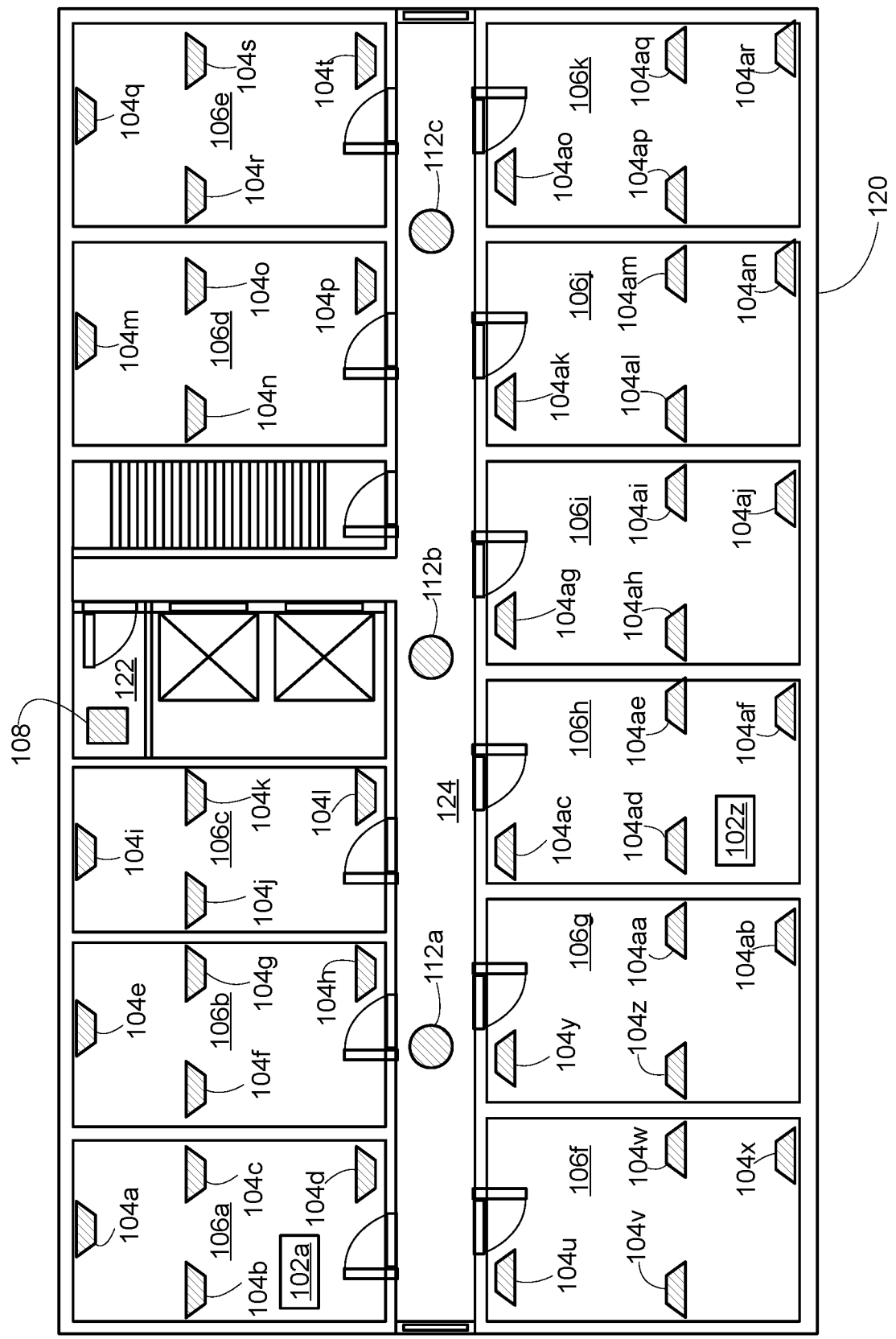
FIG. 2 shows a layout diagram illustrating the physical positions of the hubs and in-room devices of FIG. 1 as installed within a hospitality establishment according to an exemplary embodiment.

FIG. 2 shows a layout diagram illustrating the physical positions of the hubs 112 and in-room IoT devices 104 of FIG. 1 after installation within a hospitality establishment 120 according to an exemplary embodiment. The control server 108 is installed within a server room 122 and three hubs 112a, 112b, 112c are installed in the ceiling of the hallway 124. The hubs 112 are distributed generally evenly within the layout in order to minimize the average distance from each IoT device 104 to at least one hub 112. Although the IoT protocols generally support relaying of commands sent by a hub 112 between multiple IoT devices 104, there is some latency when an IoT device 104 performs a rely so according to this embodiment one preference is to keep each IoT device 104 within a predetermined distance and/or number of hops from at least one hub 112.

Each guest room 106 includes a plurality of four IoT devices 104 in this example such as a curtain motor, thermostat, and two light switches. In this embodiment, each room 106 is essentially a copy of the other rooms 106 and includes the same IoT devices 104, but this is for ease of illustration only and in other hospitality applications and other embodiments the types and numbers of IoT devices 104 in the various rooms 106 may be different.

To help describe operations of the system 100 using the example layout of FIG. 2, below are provided some samples of configuration data stored in storage device 110. In this embodiment related to a hotel application, the storage device 110 includes a database with a number of tables 126, 128, 130 utilized to store and lookup information. Although a relational database is utilized in this embodiment, the terms database and table as utilized herein are intended to describe any organization structure of data that allows information to be stored and correlated to other information. Also, not all the data for all the devices illustrated in FIG. 2 are shown below; instead, just a portion of the data is shown in order to better describe some examples in the following.

In this embodiment and taking into account the example reference numbers and associated devices shown in FIG. 1 and FIG. 2, the user-to-room table 126 includes the following information:

| User device ID (reference numeral) | Device Type | Registered room(s) (reference numerals) | Expiry time |
|---|---|---|---|
| 192.168.20.45 (102a) | Mobile phone | Room 101 (106a) | 2017-12-15 11:00 |
| 192.168.20.46 (102z) | Tablet | Room 115 (106h) | 2017-12-16 11:00 |
| 192.168.20.47 | Mobile phone | Rooms 117, 119 (106i, 106j) | 2017-12-19 11:00 |
| Etc. | Etc. | Etc. | Etc. |

The room-to-device table 128 includes the following information:

| Room number (reference numeral) | IoT device name | IoT device identifier (reference numeral) |
|---|---|---|
| Room 101 (106a) | Light-desk | 9234 (104c) |
| | Light-bed | 9235 (104b) |
| | Thermostat | 9236 (104d) |
| | Curtain-motor | 9237 (104a) |
| Room 115 (106h) | Light-desk | 9238 (104ae) |
| | Light-bed | 9239 (104ad) |
| | Thermostat | 9240 (104ac) |
| | Curtain-motor | 9241 (104af) |
| Room 117 (106i) | Light-desk | 9242 (104ai) |
| | Light-bed | 9243 (104ah) |
| | Thermostat | 9244 (104ag) |
| | Curtain-motor | 9245 (104aj) |
| Room 119 (106j) | Light-desk | 9246 (104am) |
| | Light-bed | 9247 (104al) |
| | Thermostat | 9248 (104ak) |
| | Curtain-motor | 9249 (104an) |
| Etc. | Etc. | Etc. |

The device-to-hub table 130 includes the following information:

| IoT device identifier (reference numeral) | IoT device name | Hub ID (reference numeral) | Hub specific details for IoT device | |
|---|---|---|---|---|
| | | | NetworkID | NodeID |
| 9234 (104c) | Light-desk | 10.0.0.80 (112a) | 1000 | 1 |
| 9235 (104b) | Light-bed | 10.0.0.80 (112a) | 1000 | 2 |
| 9236 (104d) | Thermostat | 10.0.0.80 (112a) | 1000 | 3 |
| 9237 (104a) | Curtain-motor | 10.0.0.80 (112a) | 1000 | 4 |
| 9238 (104ae) | Light-desk | 10.0.0.81 (112b) | 1001 | 1 |
| 9239 (104ad) | Light-bed | 10.0.0.80 (112a) | 1000 | 5 |
| 9240 (104ac) | Thermostat | 10.0.0.80 (112a) | 1000 | 6 |
| 9241 (104af) | Curtain-motor | 10.0.0.81 (112b) | 1001 | 2 |
| 9242 (104ai) | Light-desk | 10.0.0.81 (112b) | 1001 | 3 |
| 9243 (104ah) | Light-bed | 10.0.0.81 (112b) | 1001 | 4 |
| 9244 (104ag) | Thermostat | 10.0.0.81 (112b) | 1001 | 5 |
| 9245 (104aj) | Curtain-motor | 10.0.0.81 (112b) | 1001 | 6 |
| 9246 (104am) | Light-desk | 10.0.0.82 (112c) | 1002 | 1 |
| 9247(104al) | Light-bed | 10.0.0.81 (112b) | 1001 | 7 |
| 9248 (104ak) | Thermostat | 10.0.0.82 (112c) | 1002 | 2 |
| 9249 (104an) | Curtain-motor | 10.0.0.82 (112c) | 1002 | 3 |
| Etc. | Etc. | Etc. | Etc. | Etc. |

One of the functions of the control server 108 in this embodiment is to act as a hub controller sending and receiving messages to the various hubs 112. A management user interface (UI) may be provided by the control server 108 allowing installers to configure and setup the various information in the room-to-device table 128 and device-to-hub table 130. Likewise, updates may be applied from the management UI to any or all of the various hubs 112 and IoT devices 104. The user-to-room table 126 may also have a management UI, but in some embodiments, the user-to-room table 126 is automatically populated by the hotel's property management system (PMS) as guests arrive and leave the hotel 120.

Figure 3:
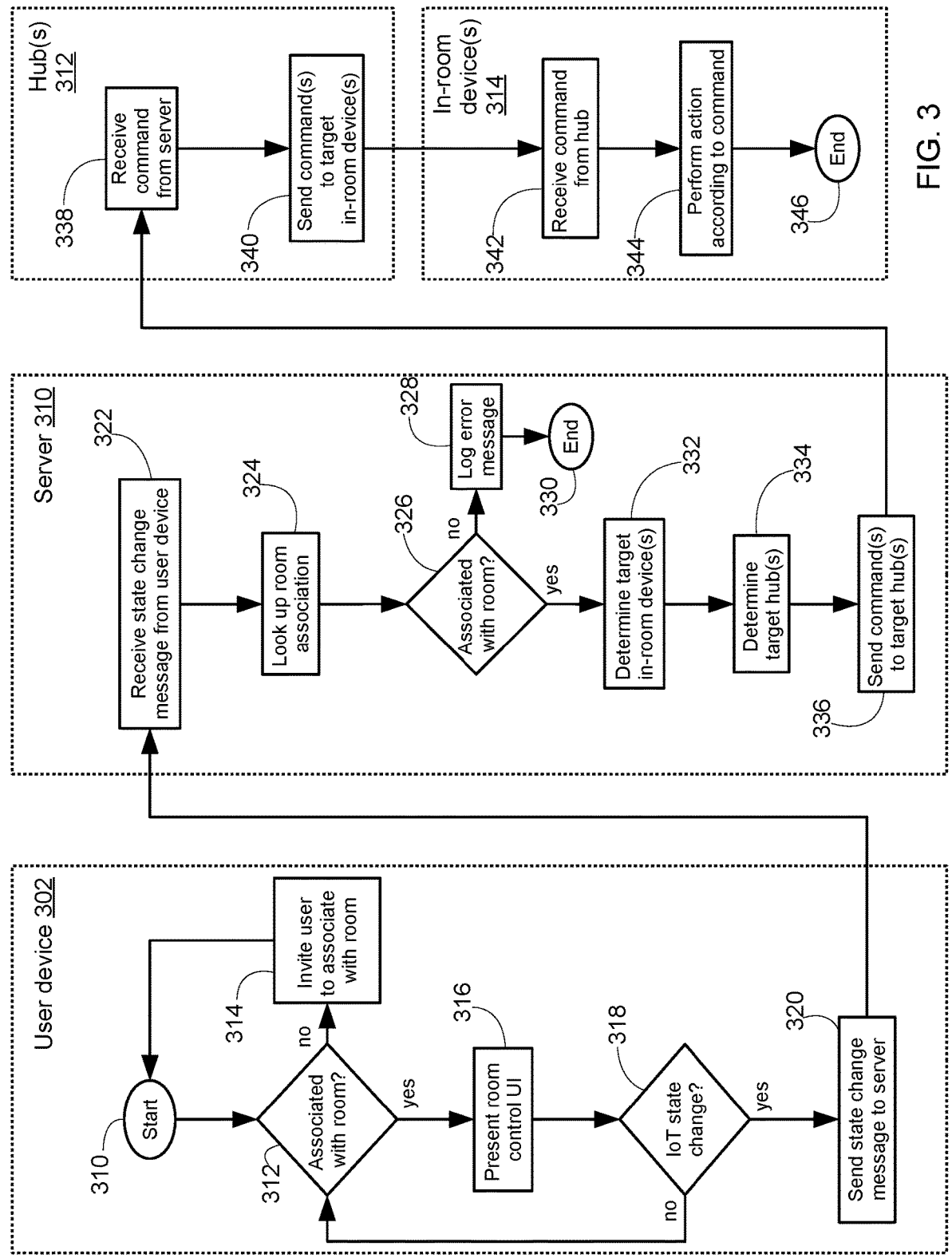
FIG. 3 shows a flowchart of steps of an in-room control process broken into groups of steps performed by the user device, the server, the hubs and the controllable devices of FIG. 1 according to an exemplary embodiment.

FIG. 3 shows a flowchart of steps of an in-room control process broken into groups of steps performed by the user device 102, the control server 108, the hubs 112 and the IoT controllable devices 104 of FIG. 1 according to an exemplary embodiment. In this embodiment, the steps are broken into four different sections including a first group of steps 300 performed by one or more processors of the user device 102, a second group of steps 302 performed by one or more processors of the control server 108, a third group of steps 304 performed by one or more processors of the hub 112, and a fourth group of steps 306 performed by one or more processors of the in-room IoT device 104. The steps of the flowchart are not restricted to the exact order shown, and, in other configurations, shown steps may be omitted or other intermediate steps added. Likewise, although a particular step may be illustrated as being performed by one of the user device 102, control server 108, hub 112, and/or IoT device 104, in other embodiments the same or similar step may be performed by one or more processors of a different device 102, 108, 112, 104. In this embodiment, the in-room control process includes the following steps:

The process begins at step 310 in response to a starting event occurrence, which may be upon a user's arrival at the hotel, the launch of an in-room control application (app) running on the user device 102, a reservation being booked by the guest for a later stay at the hospitality establishment 120, network traffic from an unrecognized user device 102 being detected on the hotel LAN by the control server 108, the user device 102 logging in for high speed Internet access (HSIA) at a login portal of the hotel 120, or any other desired starting event occurrence. In the remaining description of this example, it will be assumed that the user has launched the in-room control app on their user device 102 in order to start the process at step 310. However, it is to be understood the flowchart may be modified as required to accommodate any desired starting event.

At step 312, the in-room control app running on the user device 102 checks whether the user device 102 is currently associated with a particular guest room 106. This may be done in some embodiments by the app on the user device querying the control server 108 over the hotel LAN in order to check the user-to-room table 126. In some embodiments, upon room association being completed, the control server 108 sends a configuration message to the room control app on the user device 102 via the hotel LAN letting the app know that the user device 102 is now associated with a particular room 106. Details of the room 106 such as the room number and details of the various in-room IoT devices 104 within the room 106 may also be sent in the configuration message from the control server 108. Similar to as shown above in the user-to-room table 126, the configuration message may include a checkout time or other expiry time. Alternatively, the control server 108 may dynamically send an expiry message after an expiry event has occurred such as the user checking out of the room 106 or establishment 120.

When the in-room control app determines at step 312 that the user device 102 is currently associated with at least one guest room 106, control proceeds to step 316; alternatively, when the user device 102 is not associated with any guest room 106, control proceeds to step 314.

At step 314, the in-room control app displays instructions inviting the user to associate their user device 102 with a particular room 106. The actual room association technique may be performed in any desired manner. U.S. Pat. No. 9,137,281 issued on Sep. 15, 2015 and entitled "DYNAMICALLY ENABLING GUEST DEVICE SUPPORTING NETWORK-BASED MEDIA SHARING PROTOCOL TO SHARE MEDIA CONTENT OVER LOCAL AREA COMPUTER NETWORK OF LODGING ESTABLISHMENT WITH SUBSET OF IN-ROOM MEDIA DEVICES CONNECTED THERETO" is incorporated herein by reference. That patent describes a number of ways of associating a guest device 102 with a particular guest room 106. Examples include displaying a room's unique connect code or other passkey on a display device such as an in-room TV within the room and then having the user enter that same connect code into an app or other UI on their user device 102 to prove they are in the room 106 and can see the TV. Likewise, that patent describes a plurality of other techniques including how users may register the MAC address or other details of their devices as registered device within their reservations. In this way, at the start time of the guest's reservation (or at check-in, or upon detecting the MAC address of a registered device), the user device 102 can automatically be associated by the control server 108 with the registered room 106 of the user associated with the reservation.

There are lots of other ways that room association can occur such as having the user authenticate their personal information on the in-room control app or web browser on the user device 102. Personal information could include the user's room 106 number and last name, which are passed from the user device 102 to the control server 108 in order to cross reference with the hotel's property management system (PMS). As the above and other device-to-room association techniques are well understood in the art, further description is omitted herein for brevity. However, as will be explained with respect to FIG. 5 later in this document, there are other persistent association enhancements not yet known in the art that can also be leveraged in conjunction with this IoT room control application. Further details are provided later with reference to FIG. 5.

At step 316, the in-room control app presents a user interface (UI) that allows the user of the app to interact with the various IoT devices 104 in the user's assigned room 106. The appearance of the actual UI screen may be done in many ways. In some embodiments, it will be in pictorial format showing the guest room 106 with each of the in-room IoT devices 104 highlighted. For instance, the lamp in the corner on the picture may have a yellow circle or other UI indications that the user may interact with that device 104. Upon tapping or otherwise interacting with the lamp, the user may instruct the control app to toggle the on/off condition of the lamp. Tapping the thermostat may bring up a temperature setting dialog box. Tapping the curtains on the UI screen may cause the picture of the guest room 106 to switch to one with the curtains in the new position as selected by the user on the UI screen.

The in-room control app running on the user device 102 may have an internal database of various configurations of room 106 layouts and IoT device 104 types. Upon being associated with a particular guest room 106, the control app may retrieve or otherwise receive configuration data from the control server 108 that informs the app of what type of room 106 and which IoT device 104 types are available in that room 106. Since the visual appearance of each hotel room 106 may be different, the control server 108 may store in the storage device 110 a plurality of pictures of the various rooms 106. In this way, the control server 108 can send an actual picture of the room 106 and/or the IoT devices 104 available within the room 106 to the app running on the user device 102. The UI screen displayed at step 316 may thereby be customized and accurate for the particular room 106 with which the user device 102 is currently associated. If the user device 102 later becomes associated with a different room 106 such as when the guest upgrades to a VIP room or even switches to a different hospitality establishment 120 or location, the app retrieves from the control server 108 a new picture for the new room 106.

Of course, pictures of the room 106 are not the only way a room control UI may be presented. Other types of room control UI's include top-view maps of the room 106 layout with the IoT devices 104 labeled appropriately. Like the room 106 picture, the room 106 maps may be dynamically retrieved and/or customized by the in-room app on the user device 102 according to configuration data and messages received from the control server 108. In other embodiments, a generic in-room device control UI may be displayed that does not include any information about the physical location of the devices 104. However, the generic in-room control UI screen may still be customized by only including IoT devices 104 that are actually present in the user's registered room 106. Again, this information is received from the control server 108. In yet other embodiments, instead of (or in addition to) touch screen based user interfaces, voice commands may also be accepted by the user to interact with and change states of the various IoT devices 104.

At step 318, the room control app of the user device 102 determines whether a state change of a particular one or more of the IoT devices 104 is required. A state change may be required upon the user changing an IoT device 104 setting in the UI screen at step 316, for example. Additionally, state changes of devices 104 may also be set up in advance by the user to execute at certain times. For instance, the UI interface at step 316 may allow the user to set a wake-up alarm to occur in the morning and to open the curtains and to automatically let the sunlight into the room. Additionally, automation scripts created and/or stored within the in-room control app on the user device 102 may trigger a plurality of state changes in a predetermined sequence and may include delays between the state changes. When a state change of an IoT device 104 is required, control proceeds to step 320. Alternatively, when no state change is currently required, the process returns to step 312 to make sure the user device 102 is still associated with the room 106.

At step 320, the user device 102 generates and sends a command to the control server 108. This may be done by the in-room control app running on the user device 102 sending a state change message with an identification of a target in-room device 104 and an associated state change for that target device 104. The identification of the target in-room device 104 may specifically identify the target IoT device 104 if the app has this information, or may simply specify the type or a high-level descriptor of the target device 104 such as "Light-desk", "Light-bed", "Thermostat", or "Curtain-motor". Using high level descriptors is beneficial to avoid the control server 108 having to inform the app of every unique IoT device identifier in the room 106. Instead, the app can be preprogrammed with a number of types of IoT devices 104 and the control server 108 may simply indicate which types are present in the room 106 associated with the user device 102.

At step 322, the control server 108 receives the state change message from the user device 102.

At step 324, the control server 108 the queries the user-to-room table 126 in order to find the room 106 that is currently associated with the user device 102 from the which the state change message was received. For instance, if the state change message was received from the user device 102a having IP address 192.168.20.45, the control server 108 determines that the associated room is "Room 101", which is illustrated as room 106a in the floor plan layout of FIG. 2. In another example, if the state change message was received from the user device 102z having IP address 192.168.20.46, the control server 108 determines that the associated room is "Room 115", which is illustrated as room 106h in the floor plan layout of FIG. 2. In some cases, a state change message may be received at step 322 from a user device 102 that is not currently associated with any room 106. This may occur in the event a rogue user device 102 is attempting to hack the control server 108 or may simply be because the user device-to-room association expired in the time intervening between when the app on the user device 102 checked for the room association during step 312.

At step 326, when the user device 102 was found at step 34 to currently be associated with a particular room 106, control proceeds to step 332; otherwise, control proceeds to step 328 to log the error.

At step 328, the control server 108 logs an error message that a state change message was received from a user device 102 not currently associated with any particular guest room 106.

At step 330, the process may end by the control server 108 taking no further action and just ignoring the state change message received at step 32 since it was not received from a user device 102 currently associated with a particular guest room 106. However, in some embodiments, the control server 108 may send an error message back to the in-room app on the user device 102, and the error message may cause the user device 102 to return to step 314 to invite the user to associate their device with a particular guest room 106. Instructions may be provided letting the user know the various ways room 106 association may be performed at that particular hospitality establishment 120.

At step 332, the control server 108 queries the room-to-device table 128 in order to find the details of the target IoT device 104 identified in the state change message received at step 322. The query at step 332 may involve searching for the row that matches both the room number found at step 324 and the target IoT device name received at step 322. For instance, if the target IoT device name received at step 322 is "Curtain-motor" and the associated room found at step 324 is "Room 115", the IoT device identifier found at step 332 will be "9241", which corresponds to IoT device 104af in the layout plan of FIG. 2.

At step 334, the control server 108 queries the device-to-hub table 130 in order to find the hub 112 details related to the target IoT device 104 identifier determined at step 332. Continuing the above example where the target IoT device identifier found at step 332 is "9241" (i.e., the curtain-motor IoT device 104af), the hub 112 that controls this IoT device 104af is found to have the IP address of 10.0.0.81, which corresponds to hub 112b in the layout plan of FIG. 2. Other hub specific details for the target IoT device 104af may also be stored in the device-to-hub table 130 including a 4-byte networkID and a 2-byte nodeID. These details may be hub 112 specific and may change depending on the consumer brand of the hub 112 and the various wireless (e.g., Zigbee v. Zwave) protocols utilized by the hub 112 to communicate with IoT devices 104.

In some embodiments, the IoT device identifier stored in the room-to-device table 128 and in the first column of the device-to-hub table 130 is a unique identifier of the IoT device 104 across the hospitality establishment 120. In this way, the control server 108 can uniquely identify each specific IoT device 104 and differentiate between them. However, the hub specific details for each IoT device 104 may or may not be unique for each IoT device 104 at the hospitality establishment 120. For instance, it may be the case that nodeIDs for separate IoT devices 104 are the same across different hubs 112. The reason is that each hub 112 is only concerned with the IoT devices 104 connected to that particular hub 112. At the level of the hubs 112, each hub 112 may have no visibility or knowledge of any of the other IoT devices 104 at the establishment 120 that are coupled to and controlled by other hubs 112. Likewise, each hub 112 may not be aware of other hubs 112 and may operate in isolation from the other hubs 112. However, since the control server 108 has visibility and knowledge of all the devices 104 and their associated hubs 112, the control server 108 can send commands and remotely control all IoT devices 104 via the hubs 112 at the establishment 120.

At step 336, the control server 108 sends a command to the target hub 112 determined at step 334. The command may include the hub specific details for the target IoT device 104 along with an indication of the desired state change for that target IoT device 104. This command may be sent by accessing an application programming interface (API) provided by the hub 112.

At step 338, the target hub 112 receives the command sent by the control server 108 at step 336.

At step 340, the hub 112 generates and sends a command to the target IoT device 104 identified by the command received at step 338.

At step 342, the target IoT device 104 receives the command sent by the hub 112 at step 340. This command may be received either directly from the hub 112 or via one or more retransmission relays (i.e., hops) from intermediate IoT devices 104.

At step 344, the target IoT device 104 performs the action specified in the command. For example, the action may involve toggling the lights, turning up or down the heat settings, locking or unlocking the door, etc.

As mentioned above, automation scripts may also be included and supported in the system 100. This may involve new steps within the server group of steps 310 in FIG. 3 when the script is stored at the control server 108. For instance, the user device 102 may send a simple state change message like "goodnight" at step 320. Upon receiving the "goodnight" state change message, the server 108 may lookup a corresponding automation script from the storage device 110. For example, the "goodnight" script may involve turning off both in-room IoT lights, closing the curtains, and reducing the temperature to a cooler 65 degrees Fahrenheit better for sleeping. This example script involves four different in-room IoT devices 104. For this reason, the steps 332, 334, and 336 in FIG. 3 are all modified to occur for each of the separate IoT devices 104 and their associated state changes.

Beneficially, there is no requirement that the separate IoT devices 104 operated upon by a single automation script need be coupled to a same hub 112. Instead, the control server 108 can lookup and send commands to any combination of different hubs 112 in order to achieve the desired automation script for all the affected IoT devices 104. Taking the above-described "goodnight" state change message as an example, if such a message was received from a user device 102z that was found to be associated with guest room 106h, the control server 108 will send commands to the first hub 112a to change the states on "light-bed" IoT device 104ad and "Thermostat" IoT device 104ac, and the control server 108 will send commands to the second hub 112b to change the states on "light-desk" IoT device 104ae and "Curtain-motor" IoT device 104af.

Combinations of scripts on the control server 108 and the hubs 112 may together be utilized as well. For instance, in some embodiments, the script on the server 108 triggers related scripts on one more hubs 112 to do the actions. Again taking the above-described "goodnight" state change message as an example, the first hub 112a has a "goodnight-room115" script that has two devices 104ad, 104ac in it, and the second hub 112b has a "goodnightroom115" script that has two devices 104ae, 104af in it. The control server's 10 script triggers both of those sub-scripts (i.e., "goodnight-room115" on each of hubs 112a and 112b) to activate the full goodnight script in room 115 (e.g., room 106h in FIG. 2). A single command to a particular hub 112 may thereby result in any number of follow-on commands to various IoT devices 104 coupled to that particular hub 112. The top-level commands that need to be sent from the server 108 via the hub 112 APIs are therefore reduced because it is not needed to send a command for each device 104ac, 104ad, 104ae, 104af from the server 108 to the hubs 112a, 112b.

There is likewise no requirement that the separate IoT devices 104 operated upon by a single automation script need be located in a single room 106. For instance, the hospitality establishment 120 itself may have an automatic script that runs upon seasonal changes to reset the default temperature (e.g., heat/air conditioning settings) throughout all rooms 106 to a default temperature better suited to the new season. This may involve the control server 108 sending commands to all the various hubs 112 that are controlling at least one thermostat IoT device 104. In another example, upon the building fire alarm being triggered at night, the control server 108 may automatically execute a fire alert automation script that involves sending commands to all the hubs controlling at least one IoT lights 104 in a guest rooms 106 to immediately turn on the lights and help wake up the guests.

Automation scripts may also be stored and controlled by a user device 102. For instance, a particular user may have a preferred room temperature and light setting and may set up a "my room" script within their room control app or user profile settings. The script may be stored within a storage device on the user's device 102 or may be within a cloud based user profile account associated with the user device 102, for example. Upon entry to a guest room 106, the user may trigger the "my room" script to set up their guest room 106 with their preferred settings. Having the script managed and/or stored on the user device 102 beneficially means that the user can customize and change their script settings even when not in communication with the control server 108. Furthermore, the same script can be utilized as the user travels to different hospitality establishments 120 and there is no requirement that the control server 108 at each hospitality establishment 120 be preconfigured with the user's personal automation script(s).

In the event the user's script involves sending unachievable commands and/or to commands to IoT devices 104 that are not actually present in the user's currently registered room 106, the control server 108 may either ignore the unachievable commands/unavailable target IoT devices 104, or may automatically convert the commands and target IoT devices 104 specified in the state change message from the user device 102 to their equivalents and/or similar ones actually available in the user's room 106.

Regardless of whether the automation script is stored and/or actioned by the user device 102 or the control server 108, the same benefit applies that the script may work any combination of IoT devices 104 regardless of whether these IoT devices 104 are coupled to a same hub 112 and regardless of whether the IoT devices 104 are in a same room 106. As long as the user device from which the script and/or state change messages is received is authorized to control the required target IoT devices 104, the control server 108 can easily determine which hubs 112 need to be involved and can send the appropriate commands at step 336. In this way, a user may be dynamically granted access by the control server 108 to control IoT devices 104 in multiple rooms 106 such as when a family is staying in multiple rooms 106 of the hotel 120.

Figure 4:
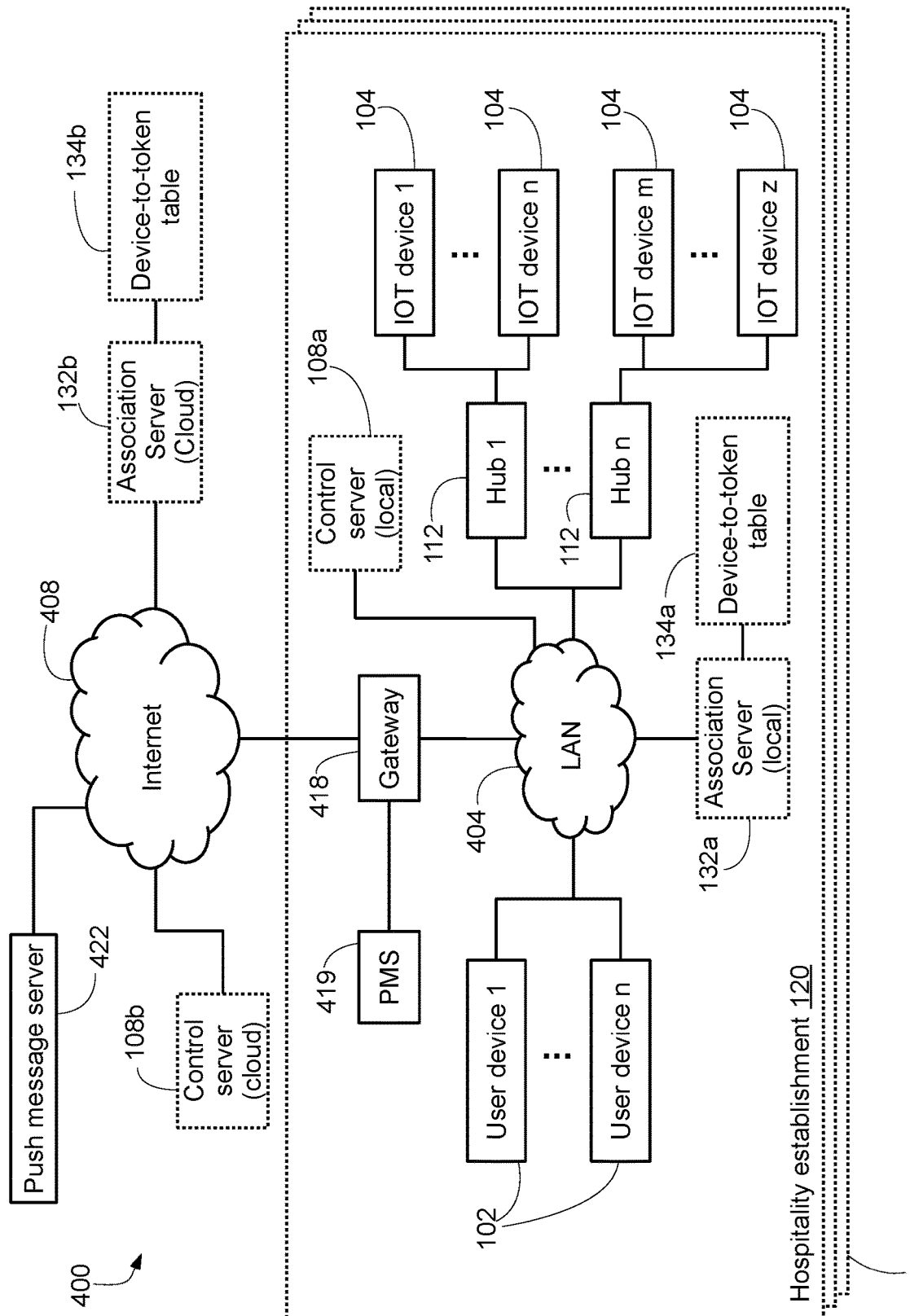
FIG. 4 illustrates a block diagram of a system with one or more control server(s) coupled either locally at a hospitality establishment and/or remotely via the cloud for controlling a plurality of hubs and IoT devices coupled thereto according to an exemplary embodiment.

FIG. 4 is a block diagram of a system 400 allowing user devices 102 to remotely control a plurality of in-room devices 104 installed in different rooms 106 as the user moves between a plurality 401 of different hospitality establishments 120 according to an exemplary embodiment. As illustrated, the system 400 includes similar elements to those illustrated in FIG. 1 including one or more user devices 120, one or more hubs 112, and a plurality of in-room IoT devices 104. As in FIG. 1, the various in-room IoT devices 104 are distributed throughout the rooms 106 of the hospitality establishment while the hubs 112 are fewer in number than the number of rooms such that a single hub 112 may control multiple IoT devices 104 including some IoT devices 104 located in different rooms 106. In FIG. 1, there was illustrated a single control server 108 and a single association server 132 with associated device-to-token table 134.

As previously mentioned, the control server 108 may be located either locally at the hospitality establishment or in the cloud. This is represented in FIG. 4 where the system 400 illustrates both a local control server 108a coupled to the hotel LAN 404 and a cloud control server 108b coupled to the Internet 408. Likewise, whereas FIG. 1 illustrates one association server 132, this server 132 may be located either locally and/or externally as illustrated by local association server 132a and cloud association server 132b in FIG. 4. The local association server 132a includes a storage device with a device-to-token table 134a and likewise the cloud association server 132b includes a storage device with a device-to-token table 134b. Again, these two device-to-token tables 134a, 134b may be one in the same or may be copies of the same data stored at different locations (one local and one remote) in some embodiments. A network gateway 418 is coupled between the hotel's LAN 404 and the Internet 408 and controls access of network traffic between these two networks 404, 408. A property management system (PMS) 420 of the hotel 120 is coupled to the gateway 418, and an external push notification service server 422 is coupled to the Internet.

In some embodiments, user devices 102 send commands to the local control server 108a, which then sends one or more corresponding commands to the various hubs 112 and the hubs 112 pass control signals to the various IoT devices 104. In such a configuration, the communications stay local on premise at the hospitality establishment 120 and may be more reliable in the event the hotel's connection to the Internet goes down.

In other embodiments, the user devices 102 may pass commands to a cloud-based control server 108b via the Internet 408, which then sends one or more corresponding commands back down to the hubs 112 at the hospitality establishment. A benefit of this type of configuration is that a single cloud-based hub control server 108b may be used across a plurality 401 of different hospitality establishments 120. For instance, the cloud control server 108b may be a hub controller for a single vendor that operates and manages a plurality of information technology (IT) services across the plurality 401 of hotels 120.

The cloud server 108b may perform additional steps to determine the one of the plurality of hospitality establishments 401 to which the state change message pertains. In some cases, the user device 102 includes in the state change message a location identifier to help the cloud control server 108b determine the correct establishment 120. One or more of the various tables described above such as the user-to-room table 126, room-to-device 128, and device-to-hub 130 may be stored centrally at a storage device coupled to the cloud control server 108b. These tables may further include a column that includes location information for different hospitality establishments. For instance, another "hotel ID" column may be added such that the cloud control server 108b can determine a target hub associated with a target IoT device 104 at a specific hospitality establishment 120. For instance, the location identifier may be a public network address of the gateway 418 at the hospitality establishment 120, which may be sent to the user device 102 by the gateway 418. In other examples, the app on the user phone may recognize the hotel LAN 404 or any device thereon and thereby know the exact hotel ID value to include within the state change message.

Furthermore, because the user device 102 can send commands to operate in-room IoT devices 104 via the cloud based control server 108b, it is not a requirement that the user device 102 be coupled to the hotel's LAN 404. This allows changes to be made by the user to their in-room devices even when the user is not within their hotel room 106. For instance, the user may activate air conditioning in advance prior to arrival at the hotel 120 so the room 106 is at a comfortable temperature upon arrival. In such situations when the user device 102 is not coupled to the hotel LAN 404, the location identifier included by the user device 102 in the state change message may be a GPS coordinate or other location identifier such as provided by an operating system application running on the user's device 102. Examples include coordinates or other location information provided by Google® maps, Apple® maps, etc.

In yet other embodiments, both local and cloud control servers 108 may be present for controlling hubs 112 at a single hospitality establishment 120 according to user commands. Some user devices 102 such as those connected to local LAN 404 may utilize the local control server 108a and other user devices 102 such as those connected to the Internet 408 may utilize the remote control server 108b. Both the control servers 108a, 108b may include application programming interfaces (APIs) allowing the app running on the user device to send state change messages and to send/receive other types of data to/from the IoT devices 104 for which that user device is authorized to access.

Figure 5:
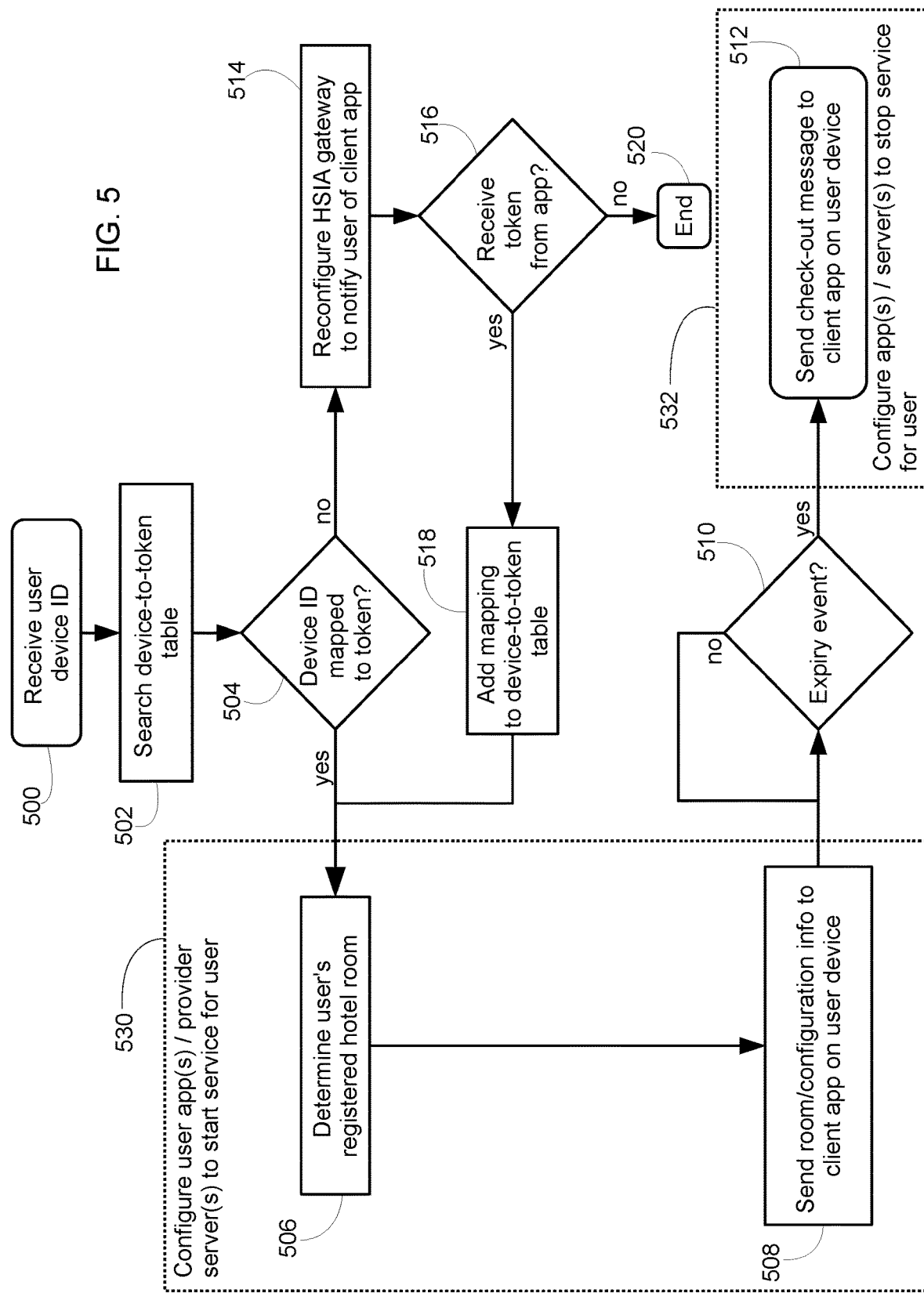
FIG. 5 is a flowchart of steps of a persistent room association and configuration process for simplifying the configuration of an in-room control application (app) running on a user's device as the user moves between different hospitality establishments according to an exemplary embodiment.

FIG. 5 is a flowchart of steps of a persistent room association and configuration process for simplifying the configuration of an in-room control application (app) running on a user's device 102 as the user moves between different hospitality establishments 120 according to an exemplary embodiment. The steps of FIG. 5 may be performed by the one or more processors of the control server 108 or of another server at the hotel 120 such as the local control server 108a and the association server 132a, or by a server in the cloud such as the cloud control server 108b or association server 132b. The following example will focus on the local controller server 108 and association server 132; however, it is to be understood the actual server may be changed and the various local servers 108, 132, 108a, 132a, 418 may be implemented together on a single on-premise computer server acting in multiple roles at the hotel 120. This also applies to the cloud servers including the control server 108b and association server 132b, which may be implemented on a single computer server located anywhere and coupled to the Internet 408. The steps of the flowchart are not restricted to the exact order shown, and, in other configurations, shown steps may be omitted or other intermediate steps added.

The process begins at step 500 when a component such has the control server 108 receives a device identifier such as a MAC address from the user device 102.

The device identifier may be sent to the control server 108 directly by the user device 102. For instance, upon a guest arriving at the hotel 120 and connecting their user device 102 to the hotel's LAN 404, a hotel app such as an in-room control application being a software application stored in a storage device of the user device 102 may run on the user device 102 and may recognize the hotel LAN by checking for the existence of the control server 108. This may be done by the hotel app making a multicast domain name service (mDNS) query to determine whether there is a server on the hotel LAN that is acting as the control server 108 or another type of association server 132, 132a. In another example, local the control server 108 and/or association server 132, 132a may periodically and/or repeatedly broadcast/multicast an announcement of its existence to devices on the hotel LAN 404. Upon detecting the existence of the control server 108, the hotel app sends the MAC address of the user device 102 to the control server 108.

The app may already know its MAC address or be able to directly retrieve the MAC address or other device identifier of the user device 102 from the operating system and/or the underlying communication hardware in order to send to the control server 108 at step 400. Android™ devices for example can get their own MAC addresses within the app. Alternatively, the user device 102 may query another device on the LAN 404 such as querying the control server 108/gateway 418 to ask the server 108, 418 to report back the MAC address of the user device 102. The control server 108 or another device on the LAN sends back the MAC address to the user device 102 in response to the query. The MAC address may then be stored within the app so that going forward the app can always directly report its MAC address to the control server 108 at step 500. Thereafter, the MAC address along with a device communication token of the user device 102 (described further below) may both be reported to the control server 108 by the app upon first arrival at the hotel 120 and/or upon the app being run for the first time. This may occur at either or both of steps 500 and/or 516 of FIG. 4.

The app running on a suitable mobile operating system such as Android could also be run outside of the hotel 120 at a local off the hotel LAN for the first time, for example at the user's home. The app at that point it is first run could send both its MAC address (or other device identifier) and its device communication token to a cloud based server (e.g., to cloud association server 132*b*) on the Internet 408 for storage in a device-to-token table 134*b*, for example. Once at the hotel 120 and on the local LAN 404, the guest's user device 102 will be seen by the control server 108 or association server 132, 132*a* such as when the user device 102 makes a DHCP request or sends other network traffic on the local LAN 404. The control server 108 thereby receives the MAC address of the user device 102 and queries the cloud association server 108*b* with the MAC address to retrieve the already stored and associated device communication token for the user device 102.

In other embodiments, the hotel app and/or the user device 102 does not need to be involved in sending the MAC address at step 500 upon connection of the user device 110 to the hotel LAN 404. Instead, the MAC address or other device identifier of the user device 102 may be sent to the control server 108 by a source different than the user device 102. In an exemplary embodiment, when the user of the user device 102 logs in at a login portal of the high speed Internet access (HSIA) gateway server 418, the HSIA gateway 418 determines the MAC address of the user device 102 by inspecting network traffic received from the user device 102. The gateway 418 then informs the control server 108 and/or association server 132, 132*a* of the MAC address of the user device 102.

Having the local gateway 418 at the hotel detect the MAC address of the user device 102 may be particularly beneficial in embodiments utilizing Apple® iOS® based devices in conjunction with a cloud based association server 132*b*. iOS® currently does not allow apps to determine the MAC address of the user device on which the app is running. Likewise, a cloud-based association server 132*b* cannot usually see the MAC address of the user device 102 only by inspecting packets sent by the user device 102 because the packets have traversed the Internet 408 and the originating MAC address is lost. For this reason, the local HSIA gateway 418 may extract the MAC address of the user device 102 from local network traffic sent by the user device 102 on the hotel LAN 404 and then transmit the detected MAC address to the cloud association server 132*b* and/or the local control server 108/association server 132, 132*a*. As another benefit, when another device such as the HSIA gateway 418 reports the MAC address (or other device identifier) of the user device 102, it is not required that the app be running on the user device 102 at the time the user device 102 arrives or is utilized on the hotel LAN 404.

At step 502, the control server 108 and/or association server 132,132*a* searches a device-to-token table 134, 134*b* in order to try and find whether the MAC address (or other device identifier) received at step 500 is currently associated with any device communication token. The device-to-token table 134, 134*b* includes a mapping of device identifiers such as MAC addresses of user devices 102 to device communication tokens. Each MAC address may be associated to a single, unique device communication token. Device communication tokens include well-known push notification tokens utilized to address push notification messages to a particular instance of an application running on a particular mobile device and for which a particular user is currently logged in. For instance, Apple®, Google®, and Microsoft® all have push notification tokens allowing developers to push notification messages via their respective push message servers in order to send messages to and notify app users of relevant events. As push notification tokens and the methods of sending push notification messages using these tokens on various app platforms are well understood in the art, further description is omitted herein for brevity. Other types of device communication tokens instead of or in addition to push notification tokens may be utilized in other embodiments. For example, any type of address for uniquely identifying a particular instance of the hotel app associated with a particular user may be employed as the device communication token in other embodiments.

At step 504, the control server 108 and/or association server 60 determines whether there is a particular device communication token associated with the MAC address (or other device identifier) received at step 500. When yes, control proceeds to step 506; otherwise, control proceeds to step 514.

At step 506, the control server 108 determines the user's registered hotel room 106. There are number of ways this may be done in different embodiments.

The user-to-room table 126 is utilized by a login portal of the gateway 418 to correlate guest devices brought to the hotel with registered rooms 106 at the hotel 120. For instance, the user device 102 may be brought to the hotel 120 by a guest who is assigned to a particular room 106. When the guest utilizes user device 102 to sign in at a login portal provided by the HSIA gateway server 418, the gateway 418 may confirm the guest's identify with the PMS 420 and store a record of the guest room as being associated with the user device 102 in the user-to-room table 126.

Given the MAC address (or other device identifier), the HSIA gateway 418 may simply look up the user's registered guest room from the user-to-room table 126. As previously mentioned, users may be required in order to log in at the HSIA gateway in order to obtain Internet access. Part of the log in process may involve the user inputting their room number. Authentication performed by the login portal may involve confirming the user's last name or other personal identification information matches the currently registered room of the specified room number in the property management system (PMS) 420. This type of authentication is referred to as "PMS authentication" and is well known in the art of high speed Internet access for hospitality establishments. Since the HSIA gateway 418 has already performed PMS authentication as a part of the HSIA login process, the gateway 418 may store a record of the room number with which each user device is associated. The gateway 418 may then send a room number message to the control server 108 either together with the MAC address at step 500 or separately such as when the MAC address is provided at step 500 by another device different than the gateway 418.

In other embodiments, the control server 108 queries one or more other devices in order to determine the room number associated with the MAC address (or other device identifier) received at step 500. For instance, the control server 108 may query a device-to-user database (not shown) in order to lookup the last name or other personal identification information of the user that is associated with the MAC address (or other device identifier) received at step 500. For instance, user devices 102 may be mapped to user full names, loyalty program identifiers at a user profile server coupled the Internet 408. Once the user's name or other identifying information is found, the control server 108 may query the property management server (PMS) 420 at the hotel 120 in order to look up which room number is associated with that user. In yet other embodiments, the control server 108 queries the gateway 418 at the hotel in order to ask for the room number associated with the MAC address (or other device identifier) received at step 500.

At step 508, the control server 108 sends a configuration message to the to the hotel app running on the user device 102. The configuration message is sent in some embodiments by the control server 108 first generating a push notification message including those details, and the push notification message is transmitted to the user device 102 through an external notification service 422 accessed via a message server coupled to the Internet 408. The notification message is addressed by the device communication token determined at step 204 such that it will be received only by the hotel app installed on the user device 102. A silent notification message may be utilized such that the message does not show on the user device 102 to the user. In some embodiments, the notification message further includes a network address (e.g., Internet Protocol IP address) of the control server 108 at the hotel 120 where the user device is now registered.

Upon receipt of the notification message, the operating system on user device 102 automatically activates the hotel app in order that the app can receive the notification message. This is beneficial because the user is not required to manually open the hotel app. As long as the app is installed on the user device 102 and the user's login state is preserved with the app, the notification service will deliver the notification message to the user device 102 when network connectivity is available, and the user device 102 will deliver the message to the app.

Any required login credentials and/or other setup information related to the room control functionality and associated room 106 may also be sent at step 212 utilizing other types of messages in addition to or instead of push notification messages in some embodiments. For instance, any desired method of sending messages to an app may be utilized at step 212 such as background message services, push messages, messages pulled or otherwise retrieved by the user device 102, etc. In general, configuration data enabling the hotel app to become aware it is associated with a particular guest room 106 and to know which types and numbers of IoT devices 104 are available for remote control in that room 106 is sent from a server such as the control server 108 to the user device 102 so that it can be received by the app on the user device 102. The message with the required configuration data may be sent directly over the Internet and/or hotel LAN, or may involve transmission via an external messaging server 422.

Upon receiving the configuration message, the hotel app automatically configures itself and may present the room control UI screen to the user or may present a notification message to the user that room control functionality is now available.

At step 510, the control server 108 determines whether a predetermined expiry event has occurred. Examples of expiry events that may be utilized include receiving a message from the PMS 420 that the user associated with user device 102 has now checked out, that the room 106 associated with the user device 102 is now vacant, that a predetermined checkout time has now been reached, that the user has manually logged out of the hotel app, etc. In response to the expiry event occurring, control proceeds to step 512 to remove the user-to-room association in table 126; otherwise, no action is taken and the user is able to make in-room IoT device 104 state changes as desired.

At step 512, the control server 108 deletes the association of the user device 102 with the guest room 106 from the user-to-room table 126.

At step 514, because the device ID received at step 200 is not associated with any device communication token, the control server 108 sends a message to the HSIA gateway server 418 in order to send a message to the user device 102 informing the user of the availability of the in-room control services at this hospitality establishment 120 and invites the user to install and/or log in to the hotel app. The fact that there is no token associated with the device identifier may mean that the user has never installed, run, or logged in to the hotel app on user device 102. For this reason, the HSIA gateway server 418 or another server in system 100 such as a login portal attempts to get the user to install and log in to the hotel app on the unrecognized user device 102. A special type of link or redirect message causing the user device 102 to either open, install, or redirect to the app may also be sent at step 514.

At step 516, the control server 108 checks to see whether it has now received the device communication token from the hotel app running on user device 110. This will occur in the event the user has followed the instructions of the notification message displayed at step 218 and installed or run the hotel app. Upon execution, the hotel app looks for a control server 108 for room control services. If found, the hotel app transmits its device communication token to the control server 108. If a device communication token is now received from the hotel app, control proceeds to step 222; otherwise, control proceeds to step 520.

At step 518, the association server 132,132a stores a mapping of the device ID received at step 500 with the corresponding device communication token received at step 516 in the device-to-token table 134, 134a. This step may involve the control server 108 first sending the device ID and the device communication token to the association server 132a,134a for storage. Control then continues to step 206. From this point on, the device identifier received at step 500 (e.g., MAC address of the user device 102) is mapped to the device communication token (e.g., push notification token) for the hotel app on the user device 102. Upon future instances of step 504 such as when the user device 102 arrives at another hotel 120 employing system 400, the control server 108 will find the user device's 2 MAC address (or other device identifier) is associated with the device communication token added to the device-to-token table 132, 132a at step 518.

In some embodiments, the device identifier (e.g., MAC address) at step 500 is temporarily stored along with the room number in an authorization queue. The point of storing the device identifier at step 500 is so it can be retrieved later after the device to token mapping has been completed at step 504 since that process happens asynchronously. In the scenario where the mapping is not already set up, the mapping will thereafter be created at step 518 and then the authorization queue can be utilized. In the scenario where the mapping is already set up, (e.g., "yes" branch from step 504), the authorization queue is stored at step 500 but then immediately used since the mapping to token is already done.

Except for when a new user installs and runs the hotel app at step 514, all the above steps may proceed automatically without user interaction as the user travels to different hospitality establishments 120. As long as the device identifier of the user device 102 is associated with a device communication token of the hotel app, the hotel app will automatically be configured for in-room control functions of the user's room 106 each time the user arrives at a new hotel 120 (step 508). This association and configuration will occur behind the scenes without requiring user involvement.

Concerning step 324 and security of the in-room control functionality, the above flowcharts of FIG. 3 and FIG. 4 may be modified such that, in other embodiments, the control server 108 or another device sends a randomly generated key to each user device 102 via the notification token system (Apple Push Notification Service for example). This may be done periodically and/or when an IoT change command is sent from a user's device and received by the control server 108 at step 322, for example. The user device 102 receives the key and sends it back to the control server 108 for verification. The key may be included along with the state change message sent at step 320 or may be sent within a predetermined time after a state change message is sent to the server 108. The control server 108 compares the most recently generated key for that user device 102 with the key that was received from the user device 102 in order to verify that the user device 102 from which the state change message was received at step 322 is actually the correct user device 102. In this way, the user's device 102 is verified by the server 108 to actually be sending the command and not a hacker who spoofed the IP and/or MAC of that user's device 102.

Each of the various devices illustrated above such as the user devices 102, control server 108, association server 132,132a,132b, hubs 112, control servers 108a,108b and IoT devices 104, may be computing devices having processors executing software instructions from a storage device. One or more processors may be included in a central processor unit (CPU) of a computer server or other type of computing device acting as any one of the user devices 102, control server 108, association server 132,132a,132b, hubs 112, control servers 108a,108b and IoT devices 104. In this description, the plural form of the word "processors" has been utilized as it is common for a CPU of a computer server or embedded device to have multiple processors (sometimes also referred to as cores); however, it is to be understood that a single processor may also be configured to perform the described functionality in other implementations.

In an exemplary embodiment of the invention, Internet of things (IoT) hubs 112 are distributed in a hospitality establishment 120 and are connected to a control server 108. Various IoT devices 104 are installed in each room 106 or other separate guest area within the hospitality establishment 120. The hubs 112 are located such that each IoT device 104 is within a predetermined distance from at least one hub 104. The control server 108 has mappings of which IoT devices 104 are in which rooms 106 and has mappings of which hubs 104 are used to control which IoT devices 104. When a state change message is received from a user device 102, the control server confirms the user device 102 is currently associated with at least one guest room 106 and then determines which target IoT devices 104 are affected by the state change message. The control server 108 then sends commands to the various one or more hubs 112 that control the target IoT devices 104 in order to effect the state changes.

Although the invention has been described in connection with preferred embodiments, it should be understood that various modifications, additions and alterations may be made to the invention by one skilled in the art without departing from the spirit and scope of the invention. For example, although the above-description has focused on a hotel for illustration purposes, the present invention is equally applicable to any hospitality related location or service wishing to provide remote IoT device configuration to users including but not limited to hotels, motels, resorts, hospitals, apartment/townhouse complexes, restaurants, retirement centers, cruise ships, busses, airlines, airports, shopping centers, passenger trains, libraries, coffee shops, hotspots, etc. Additionally, in addition to the above described hospitality examples, the invention is applicable outside the hospitality industry such as when a home or corporate user desires to provide IoT device configuration to users.

Although the above description has focused on wireless Zigbee and Zwave protocols between the hubs and wired Ethernet connections from the control server 108 to the hubs 112, different combinations and permutations of wired and wireless connections 114, 116, 118 may be employed to interconnect the user devices 102, control server 108, hubs 112, and IoT devices 104. For instance, in other embodiments, wireless connections such as Wi-Fi access points and RF signals may be utilized as the connection 116 between the control server 108 and one or more of the hubs 112. NEST devices and any other proprietary and/or open standardized wireless protocols may be utilized. Likewise, wired connections 118 using any supported protocol such as IP may be utilized to connect one or more of the hubs 112 to one or more of the IoT devices 104 in other embodiments.

Although multiple database tables 126, 128, 130, 132 are described in the above description for convenience of illustration, it is not a requirement that these exact database tables 126, 128, 130, 132 be utilized. Other organizations of the same data into fewer or less tables could be employed such as where the hub identification information is included for each IoT device within a separate column of the room-to-device table 128. In this way, the device-to-hub table 130 could be eliminated, for example. Likewise, it is not a requirement that the exact information illustrated above for description purposes also be utilized in deployments. For instance, the user device ID column of the user-to-room table 126 may have MAC addresses instead of (or in addition to) IP addresses. Any type of user device ID may be utilized to recognize and identify the different user devices 102.

Although the above description has primarily focused on changing the state of IoT devices under control of the server 108, of course the communication may be bidirectional to/from the IoT devices via the hubs 112 and control server 108. In this way, command, alerts and information from the IoT devices 104 may also be sent to the user devices 102 via server 108, and vice versa. Any application supported by these devices regardless of data direction may be supported in a similar manner.

Although the above description has emphasised utilizing consumer grade hubs 112 and IoT controllable devices 104, the same techniques disclosed herein may also be utilized with commercial grade IoT hubs 112 and devices 104. Likewise, any types of LAN and WAN computer networks may be utilized in conjunction with the invention. For instance, the local network 404 at a hospitality establishment 120 may be a Wi-Fi HSIA only network that even the hubs 112 communicate on. There may be one or more local area networks 404 at the establishment 120 and some may be isolated from others using well-known VLAN techniques.

Likewise, the wide area network may be the Internet 408 or may be another network. For instance, a virtual private network (VPN) between local area networks 404 at two different establishments may be either via the Internet 408 or any other external computer network.

Although examples of an in-room control application and a hotel application running on the user device 102 have been illustrated above, of course the above-described functionality of the apps could be integrated and utilized in any type of app running on any type of user device 102. Likewise, there may be different apps for different types of devices 102 and different types of establishments 18 and different types of services (e.g., room control, SIP phone service, VOD content, etc.).

The above-described persistent room association and configuration process illustrated in FIG. 4 shows how push notification messages may be utilized to automatically configure a user device 102 upon that user device arriving at a hospitality establishment. This same process may be generalized to both start at any particular starting event occurrence and to configure any type of application running on the user device 102 along with required servers on the LAN 404 and Internet 408 for any desired service offering. For instance, besides automatically configurating IoT room control functionality on the app to be activated at high-level step 530 and to be deactivated at high-level step 532 as described above, a phone SIP client running on the user device 102 may be automatically configured at step 530 via push notification message upon arrival of the guest at the establishment having SIP phone services. Likewise, an Asterick server on the hotel LAN/Internet may also be configured at step 530 as required to work in conjunction with the app on the user device 102. The app on the user device 102 along with the Asterick server components may then be reconfigured at step 532 to deactivate the SIP phone service for the user. In yet another example, a video streaming application running on the user device 102 and one or more VOD server(s) may be automatically configured at step 530 with the login credentials to display content that is available to the registered room associated with the owner of the user device 102. Likewise, the VOD app and/or servers may be automatically configured at step 532 to prevent the user device 102 from using the VOD media content.

The above flowcharts and functionality may be implemented by software executed by one or more processors operating pursuant to instructions stored on a tangible computer-readable medium such as a storage device to perform the above-described functions of any or all aspects of the access controller. Examples of the tangible computer-readable medium include optical media (e.g., CD-ROM, DVD discs), magnetic media (e.g., hard drives, diskettes), and other electronically readable media such as flash storage devices and memory devices (e.g., RAM, ROM). The computer-readable medium may be local to the computer executing the instructions, or may be remote to this computer such as when coupled to the computer via a computer network such as the Internet. The processors may be included in a general-purpose or specific-purpose computer that becomes the access controller or any of the above-described modules as a result of executing the instructions.

In other embodiments, rather than being software modules executed by one or more processors, the above-described functionality may be performed by hardware modules configured to perform the above-described functions. Examples of hardware modules include combinations of logic gates, integrated circuits, field programmable gate arrays, and application specific integrated circuits, and other analog and digital circuit designs.

Functions of single modules may be separated into multiple units, or the functions of multiple modules may be combined into a single unit. Unless otherwise specified, features described may be implemented in hardware or software according to different design requirements. In addition to a dedicated physical computing device, the word "server" may also mean a service daemon on a single computer, virtual computer, or shared physical computer or computers, for example. All combinations and permutations of the above described features and embodiments may be utilized in conjunction with the invention.

What is claimed is:

1. A system for allowing user devices to remotely control in-room devices of a hospitality establishment, the system comprising:
   a control server coupled to a computer network;
   a plurality of hubs coupled to the control server; and
   a plurality of controllable devices located among a plurality of guest rooms of the hospitality establishment, each of the controllable devices coupled to at least one of the hubs;
   wherein the control server receives a state change message from a user device via the computer network;
   the control server determines an associated room according to the state change message, the associated room being one of the guest rooms of the hospitality establishment with which the user device is associated;
   the control server looks up an automation script specified by the state change message, the automation script listing a plurality of actions to be performed in a predetermined sequence;
   the control server determines a plurality of target controllable devices according to the plurality of actions, the target controllable devices being located within the associated room;
   the control server determines a plurality of target hubs according to the target controllable devices, each particular target hub in the plurality of target hubs being coupled to at least one of the target controllable devices;
   the control server sends one or more top-level commands to each particular target hub, each top-level command corresponding to one of the actions and specifying a change of state of one of the target controllable devices coupled to the particular target hub;
   the target hubs send a plurality of follow-on commands to change states of the target controllable devices located within the associated room to thereby perform the actions in the predetermined sequence as listed in the automation script;
   the automation script specified by the state change message includes one or more sub-scripts for execution by respective ones of the target hubs;
   the top-level commands sent by the control server to each particular target hub trigger a sub-script for execution by the particular target hub;
   each particular target hub determines one or more target controllable devices corresponding to the actions specified by the sub-script triggered for execution according to the top-level commands received from the control server, and sends the follow-on commands to the one or more target controllable devices to perform the actions in the predetermined sequence; and a total number of the top-level commands sent by the control server to the target hubs is less than a total number of the actions to be performed.

2. The system of claim 1, wherein:
the controllable devices support relaying of commands between nearby controllable devices within the plurality of controllable devices;
the hubs are substantially evenly distributed over a layout of the hospitality establishment such that each controllable device is within a predetermined distance from at least one hub; and
the predetermined distance ensures that each follow-on command is sent from the target hubs to the target controllable devices via at most a predetermined number of relay hops between intermediate controllable devices.

3. The system of claim 1, wherein at least one of the guest rooms includes a first controllable device coupled to a first hub and a second controllable device coupled to a second, different hub to which the first controllable device is not coupled.

4. The system of claim 1, wherein the control server is coupled to a local area network of the hospitality establishment and receives the state change message from the user device via the local area network.

5. The system of claim 1, wherein the control server is coupled to an external network outside of the hospitality establishment and receives the state change message from the user device via the external network.

6. The system of claim 1, wherein the control server further determines whether the user device from which the state change message is received is authorized to control each of the plurality of target controllable devices and sends the top-level commands to the target hubs to change states of the target controllable devices only when the user device is authorized.

7. The system of claim 6, wherein the control server determines whether the user device is authorized to control the target controllable devices according to information received from a property management system (PMS) at the hospitality establishment that correlates current guests to registered rooms.

8. The system of claim 6, wherein the control server determines whether the user device is authorized to control the target controllable devices according to an identifier of the user device received in the state change message.

9. The system of claim 1, wherein the control server determines the associated room according to an identifier received from the user device in the state change message.

10. A control server for allowing user devices to remotely control in-room devices of a hospitality establishment, the hospitality establishment having a plurality of controllable devices located among a plurality of guest rooms and a plurality of hubs, and each of the controllable devices being coupled to at least one of the hubs; the control server comprising:
a first communication interface coupled to a computer network;
one or more second communication interfaces coupled to the plurality of hubs;
a storage device; and
one or more processors coupled to the first communication interface, the one or more second communication interfaces, and the storage device;
wherein, by the one or more processors executing software instructions loaded from the storage device, the one or more processors are configured to:
receive a state change message from a user device via the computer network;
determine an associated room according to the state change message, the associated room being one of the guest rooms of the hospitality establishment with which the user device is associated;
look up an automation script specified by the state change message, the automation script listing a plurality of actions to be performed in a predetermined sequence;
determine a plurality of target controllable devices according to the plurality of actions, the target controllable devices being located within the associated room;
determine a plurality of target hubs according to the target controllable devices, each particular target hub in the plurality of target hubs being coupled to at least one of the target controllable devices; and
send one or more top-level commands to each particular target hub, each top-level command corresponding to one of the actions and specifying a change of state of one of the target controllable devices coupled to the particular target hub; and
wherein the target hubs send a plurality of follow-on commands to change states of the target controllable devices located within the associated room to thereby perform the actions in the predetermined sequence as listed in the automation script;
the automation script specified by the state change message includes one or more sub-scripts for execution by respective ones of the target hubs;
the top-level commands sent by the control server to each particular target hub trigger a sub-script for execution by the particular target hub;
each particular target hub determines one or more target controllable devices corresponding to the actions specified by the sub-script triggered for execution according to the top-level commands received from the control server, and sends the follow-on commands to the target controllable devices to perform the actions in the predetermined sequence; and
a total number of the top-level commands sent by the control server to the target hubs is less than a total number of the actions to be performed.

11. The control server of claim 10, wherein:
the controllable devices support relaying of commands between nearby controllable devices within the plurality of controllable devices;
the hubs are substantially evenly distributed over a layout of the hospitality establishment such that each controllable device is within a predetermined distance from at least one hub; and
the predetermined distance ensures that each follow-on command is sent from the target hubs to the target controllable devices via at most a predetermined number of relay hops between intermediate controllable devices.

12. The control server of claim 10, wherein at least one of the guest rooms includes a first controllable device coupled to a first hub and a second controllable device coupled to a second, different hub to which the first controllable device is not coupled.

13. The control server of claim 10, wherein the one or more processors are further configured to determine whether the user device from which the state change message is received is authorized to control each of the plurality of target controllable devices and to send the top-level commands to the target hubs to change states of the target controllable devices only when the user device is authorized.

14. A method of allowing user devices to remotely control in-room devices of a hospitality establishment, the hospitality establishment having a plurality of controllable devices located among a plurality of guest rooms and a plurality of hubs, and each of the controllable devices being coupled to at least one of the hubs; the method comprising:

receiving a state change message from a user device via a computer network;

determining an associated room according to the state change message, the associated room being one of the guest rooms of the hospitality establishment with which the user device is associated;

looking up an automation script specified by the state change message, the automation script listing a plurality of actions to be performed in a predetermined sequence;

determining a plurality of target controllable devices according to the plurality of actions, the target controllable devices being located within the associated room;

determining a plurality of target hubs according to the target controllable devices, each particular target hub in the plurality of target hubs being coupled to at least one of the target controllable devices;

sending one or more top-level commands to each particular target hub, each top-level command corresponding to one of the actions and specifying a change of state of one of the target controllable devices coupled to the particular target hub; and performing the actions in the predetermined sequence as listed in the automation script as a result of the target hubs sending a plurality of follow-on commands to the target controllable devices located within the associated room to change states of the target controllable devices;

wherein the automation script specified by the state change message includes one or more sub-scripts for execution by respective ones of the target hubs;

the top-level commands sent to each particular target hub trigger a sub-script for execution by the particular target hub;

each particular target hub determines one or more target controllable devices corresponding to the actions specified by the sub-script triggered for execution according to the top-level commands, and sends the follow-on commands to the one or more target controllable devices to perform the actions in the predetermined sequence; and a total number of the top-level commands sent to the target hubs is less than a total number of the actions to be performed.

15. The system of claim 1, wherein the automation script further specifies delays such that the actions listed in the automation script are performed by the target controllable devices in the predetermined sequence with specified delays between state changes of the target controllable devices.

16. The system of claim 1, wherein:

the control server determines a plurality of associated rooms according to the state change message;

the target controllable devices corresponding to the automation script are distributed across the plurality of associated rooms; and after verifying that the user device from which the state change message was received is authorized to control each of the target controllable devices distributed across the plurality of associated rooms, the control server sends the top-level commands to the target hubs to control the target controllable devices coupled to the target hubs and perform the actions listed in the automation script in the predetermined sequence.

17. The system of claim 16, further comprising a plurality of hospitality establishments, wherein:

the plurality of associated rooms housing the target controllable devices are distributed across the plurality of hospitality establishments;

the target hubs are distributed across the hospitality establishments with at least one target hub present at each hospitality establishment that has one or more target controllable devices; and the control server sends the top-level commands corresponding to the automation script to the target hubs that are coupled to the target controllable devices;

whereby, execution of a single automation script specified by the state change message changes states of controllable devices distributed across multiple hospitality establishments.

18. The system of claim 1, wherein:

the control server is connected to a storage device;

the automation script specified by the state change message is stored on the storage device; and the control server retrieves the automation script specified by the state change message from the storage device.

19. The system of claim 1, wherein:

the automation script is stored on a storage device connected to the user device; and the control server receives the automation script from the user device.

20. The system of claim 1, wherein the total number of the top-level commands sent by the control server is less than a total number of the follow-on commands sent by the target hubs.

* * * * *